United States Patent [19]  [11] 4,033,536
Hillstrom  [45] July 5, 1977

[54] MOUNTING BRACKET COIL SPRING

[75] Inventor: David U. Hillstrom, Novi, Mich.

[73] Assignee: Robert Sarkisian, Bloomfield Hills, Mich.

[22] Filed: Apr. 8, 1976

[21] Appl. No.: 674,873

[52] U.S. Cl. .............................. 248/160; 40/125 H
[51] Int. Cl.² ......................................... F16M 13/00
[58] Field of Search .................... 40/125 H, 145 A; 267/61 S; 254/10.5; 248/160

[56] References Cited
UNITED STATES PATENTS

| 3,256,594 | 6/1966 | Howard et al. | 254/10.5 |
| 3,384,348 | 5/1968 | Wicker | 254/10.5 |
| 3,646,696 | 3/1972 | Sarkisian | 40/125 H |

Primary Examiner—John F. Pitrelli

[57] ABSTRACT

An improved mounting bracket for a coil spring mounted poster display structure. The bracket comprises a metal plate having at least two stepped levels with a threaded hole formed through each level. The bracket is adapted to fit between adjacent coils of the spring so that the holes in the bracket are parallel to the axis of the coil spring. The coil spring is fastened to the poster display structure by a pair of mounting bolts which are positioned through corresponding holes in the structure and screwed into the holes in the bracket. The stepped levels in the bracket insure that the holes in the bracket will properly align with the holes in the display structure.

4 Claims, 5 Drawing Figures

MOUNTING BRACKET COIL SPRING

BACKGROUND AND SUMMARY OF THE INVENTION

The present invention relates to an improved mounting bracket for poster display devices or any other structure having coil spring mounts.

Poster display devices of the general type to which the present invention particularly relates, comprise a frame having a relatively large surface area mounted to a spring structure which permits the frame to deflect downward upon the application of a force thereto, such as, for example, the wind when the device is located out-of-doors. Such devices are shown, for example, in U.S. Pat. Nos. 3,646,696 and 3,662,482. Known devices of this type have utilized various methods of mounting the coil spring to the frame and the base of the display device.

For example, one such known device utilizes a pair of threaded J-shaped bolts that are hooked through the coils of the spring and are threadedly secured to the display structure. Although providing a relatively easy means of assembly, the "J" bolts often tend to become weak at the joint and might break after prolonged use of the poster display structure.

Another known alternative is a screw-type mount having a shaft diameter equivalent to the inside diameter of the coil spring. The shaft of the screw is threaded to mate with the coils of the spring so that the coil spring is secured to the structure by screwing the mount into the spring. The primary disadvantage of this method is that, in order to properly secure the coil springs to the frame, too many coils must be deadened. This is particulary apparent when the screw-type mount is also employed to fasten the coil springs to the base of the device. With a sufficient number of dead coils, the frame might not deflect as well as it should. In addition, this type of mounting device requires a different sized screw mount for each coil spring of a different diameter.

Another widely used method of securing coil springs to a structure is by welding. However, welding tends to weaken the springs which results in the display sign not completely returning to its upright position once deflected. Also, if welded, the display device cannot be shipped disassembled, which can be an inconvenience. Furthermore, since a weld is a permanent-type bond, a part of the display device cannot be as readily replaced in the event only a part of the structure is damaged.

The present invention seeks to alleviate the problems associated with known coil spring mounting devices by providing a mounting device that is readily installed and provides easy assembly of the display or other structure without adversely affecting the intended operation of the coil springs. In particular, the mounting bracket according to the present invention, preferably comprises a metal plate having at least two different levels. A hole is formed through each level of the bracket proximate the ends of the plate and the holes are threaded. The bracket is adapted to fit between adjacent coils of the spring so that the holes are parallel to the axis of the spring. The different levels are provided to compensate for the inclination in the coils of the spring between the ends of the bracket. A pair of mounting bolts are then fitted through corresponding holes or slots in the display structure and secured to the brackets. Since the holes in the bracket are parallel to the axis of the coil spring, the bolts inserted through the holes in the structure are easily aligned with the holes in the bracket, thus facilitating assembly.

Thus, the present invention provides a mounting bracket which can readily be secured to various sized springs without weakening the springs nor deadening a significant number of coils. In addition, the mounting bracket will remain secure to the coil spring regardless of the number of times the frame of the structure is deflected.

Brief Description of the Drawings

Additional objects and advantages of the present invention will become apparent from the following detailed description of the preferred embodiments which make reference to the following set of drawings of which.

Figure 4:
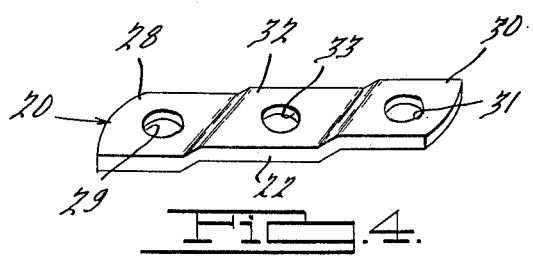
FIG. 4 illustrates the preferred embodiment of the mounting bracket.

FIG, 5 illustrates an alternative embodiment of the mounting bracket illustrated in FIG. 4.

DETAILED DESCRIPTION OF THE PREFERRED EMBODIMENTS

Figure 1:
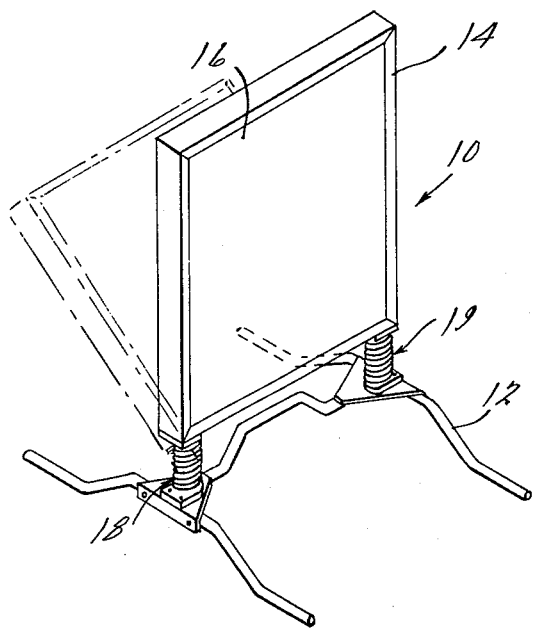
FIG. 1 is a perspective view of a poster display device having a spring mounted base.

The present invention is intended to be used primarily in conjunction with a poster display device similar to that illustrated in FIG. 1, although it is understood that it can be used to mount a coil spring to any type of structure for any purpose. The poster display device 10 shown in FIG. 1 comprises a poster frame 14 which is mounted to a base structure 12 by a pair of extension coil springs 18 and 19. The poster frame 14, which normallly extends vertically upward from the base 12, contains a rigid panel 16 adapted to have mounted thereon posters or various other advertising materials. Poster display devices 10 of this type are typically located out-of-doors to advertise services or products, such as in front of a retail store or gasoline service station. Consequently, the display devices are subjected to wind forces which could topple a rigidly mounted display sign.

To overcome this problem, poster display devices having coil spring mounts similar to that illustrated in FIG. 1, have been developed. Poster display devices of this type are disclosed in U.S. Pat. Nos. 3,646,696 and 3,662,482. Such structures are adpated to have the frame 14 of the structure 10 deflect downwardly, as illustrated in phantom lines in FIG. 1, against the bias of the coil springs 18 and 19 upon application of a force thereto. Upon termination of the force, the extension set coil springs 18 and 19 return the poster frame 14 to its vertical upright position.

Figure 2:
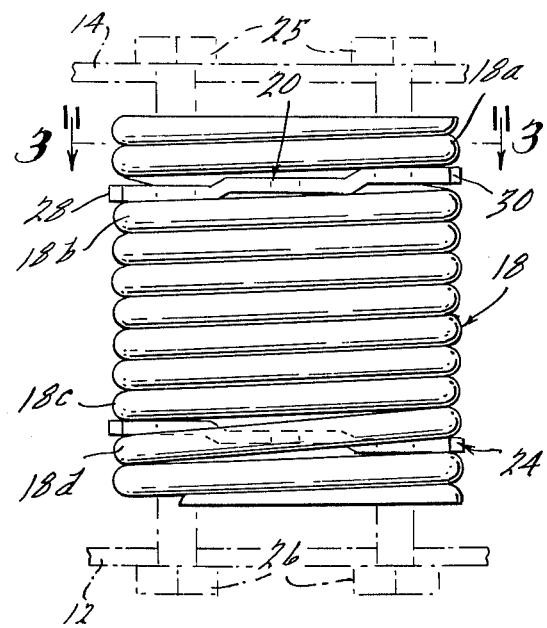
FIG. 2 is a view of a coil sring showing the positioning of the mounting brackets according to the present invention.

Referring to Fig. 4, the preferred manner of mounting the coil springs 18 and 19 to the base 12 and frame 14 of the display structure 10 is shown. The mounting bracket, generally designated by the numeral 20, comprises a metal plate 22 having three stepped levels 28, 30 and 32. Each segment 28, 30 and 32 of the plate 20 has formed therein a hole 29, 31 and 33, respectively, as shown. As illustrated in FIG. 2, mounting bracket 20 is adapted to be disposed between a pair of adjacent coils 18a and 18b at one end of coil spring 18. A similar mounting bracket 24 is disposed between an adjacent pair of coils 18c and 18d at the opposite end of coil spring 18. Mounting brackets 20 and 24 are preferably disposed between the second and third coils from the ends of coil spring 18. In this manner, mounting brackets 20 and 24 are rigidly secured in coil spring 18 while deadening only a minimum number of coils. Thus, the majority of the coils in coil spring 18 remain active.

The two outer holes 29 and 31 in segments 28 and 30 of mounting bracket 20 are preferably threaded to receive a pair of mounting bolts 25 which are fastened to the frame 14 of the display device 10. Similarly, mounting bracket 24 has threadedly secured thereto a pair of bolts 26 which are fastened to the base 12 of the display device 10. As can best be appreciated from the view of coil spring 18 illustrated in FIG. 3, once bolts 25 are screwed into holes 29 and 31, mounting bracket 20 cannot work itself free from coil spring 18 regardless of the manner in which poster frame 14 is deflected. Thus, it can be seen that mounting bolts 25 and 26 additionally serve to hole mounting brackets 20 and 24 in place.

As shown in phantom lines in FIG. 2, when threadedly secured to mounting brackets 20 and 24, mounting bolts 25 and 26 respectively, extend parallel to the axis of coil spring 18. This is particularly important in the assembly of the display device 10 in that it insures that the holes 29 and 31 in the mounting bracket 20 will properly align with the holes in the frame structure 14 of the display device 10. This is primarily the result of the different levels between segment 28 and segment 30 mounting bracket 20. Specifically, due to the inclination of coils 18a and 18b between the point of contact with segment 28 must increase a corresponding amount over the level of segment 28 in order to maintain the axes of holes 29 and 31 parallel to the axis of coil spring 18.

The middle segment 32 of mounting bracket 20 illustrated in FIG. 4, has two functions. First by dividing the difference between the levels of segments 28 and 30 into two stages, each step is relatively small, and therefore, the mounting bracket 20 can be formed by a simple stamping process without substantially diminishing the rigidity of the bracket 20. Secondly, the hole 33 in the middle segment 32 of the bracket 20 is adapted to receive an expansion rod (not shown) which also fits through the corresponding hole in mounting bracket 24 to expand the distance between the two brackets 20 and 24 and open the coils of the spring 18. This facilitates complete painting of each of the coils in the springs 18 and 19. This is important when the display device 10 is to be located primarily out-of-doors where it is exposed to the effects of the weather. Thus, as will be appreciated by those skilled in the art, by facilitating the complete painting of the coil springs 18 and 19, the problem of the coils of the springs rusting together and thereby destroying its functioning, is substantially avoided. Also, by spreading the coils and painting them on all sides, there will not be any unsightly unpainted areas visible on the coil springs when the frame structure 14 is deflected and bent by the wind.

As stated earlier, the holes 29 and 31 are threaded. (It is not necessary to provide threads in hole 33.) The holes and threads can be provided by a conventional drilling and tapping process, but preferably the holes are punched rather than drilled through the plate 22. The punching process leaves excess material on one side of the formed hole. This provides additional area for threads to be tapped in the hole and thus allows a bolt to be held more securely in place in the plate.

Figure 3:
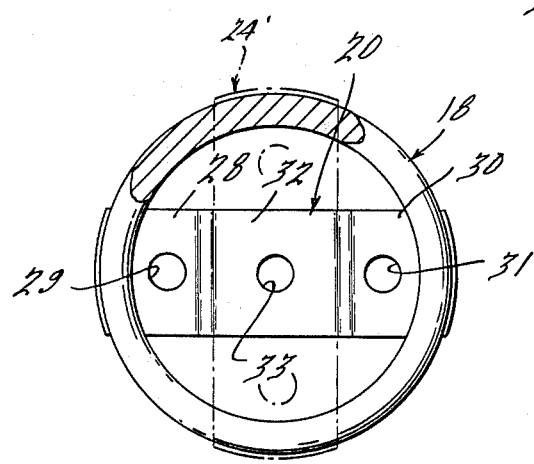
FIG. 3 is a sectional veiw of the coil spring shown in FIG. 2 taken along line 3—3.

In the embodiment shown in FIGS. 2 and 3, the brackets 20 and 24 are aligned parallel to each other relative to the axis of the spring 18. In this manner, the holes 29 and 31 in bracket 20 and the corresponding holes (not shown) in bracket 24 are in axial alignment. When the brackets 20 and 24 are placed in coil spring 18, however, they can be positioned at any angle of orientation relative to each other. A bracket 24' shown in phantom lines in FIG. 3 is positioned at an approximately 90° angle of orientation from bracket 20. This versatility of design allows the coil spring to be used where the mounting holes in the frame structure 14 and base 12 are not in axial alignment with each other, or it is necessary to mount a structure at an angle to the orientation of its base.

The mounting brackets 20 and 24 further can be used with coil springs having a wide range of wire diameters. For example, the diameter of the individual coils in coil spring 18 could be approximately twice as large or half again as small as the coils shown in FIGS. 2 and 3 and the brackets 20 and 24 would still function and operate in the same manner. In practice, a single size of mounting bracket (similar to the bracket 20 shown in FIG. 4) has been used to mount coil springs having wire diameters in the range of from 0.281 inches to 0.480 inches. Another advantageous feature of the present invention is that the mounting bracket is self-aligning in the coil spring when it is secured to a structure. When the coil spring is assembled and the bolts are tightened, the bracket tends to twist and conform itself to the pitch of the coils of the spring. This insures that the coil spring will be positioned perpendicular to the surface on which it is mounted.

Figure 5:
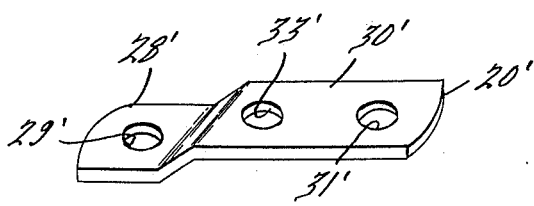

Referring now to FIG. 5, an alternative embodiment of the mounting bracket 20 illustrated in FIG. 4 is shown. The mounting bracket 20' illustrated in FIG. 5 is substantially equivalent to the embodiment shown in FIG. 4 except that there is no intermediate step between segments 28' and 30'. The entire difference in the levels between segments 28' and 30' is provided by a single joint without any significant intermediate area. Mounting bracket 20' is secured between the coils of spring 18 in the same manner as that described with relation to mounting bracket 20 illustrated in FIG. 4 and functions in the same manner.

Although the present invention has been described with particularity relative to mounting a poster display frame structure to a base, it is understood that the inventive mounting brackets can be used to mount a coil spring to any structure or surface. The mounting brackets are relatively inexpensive to manufacture, provide axially aligned openings, provide a minimum of deadened coils, can be used with a wide range of coil springs (having different wire diameters), do not weaken the coil spring structure, and provide for ease of assembly of the finished structure. The brackets are adaptable for use with any coil springs and provide increased uses and versatility of the coil springs themselves.

While the above description constitutes the preferred embodiments of the invention, it will be appreciated that the invention is susceptible to modification, variation and change without departing from the proper scope or fair meaning of the accompanying claims.

I claim:

1. An improved mounting apparatus for mounting a structure to a base by an extension spring wherein the mounting surface of said structure is substantially parallel to the mounting surface of said base, comprising

- a first bracket for fastening said coil spring to said mounting surface of said structure disposed between a first pair of adjacent coils proximate to one end of said spring and secured to said spring at radially opposed points thereof by the extension force to said coils, said bracket having formed therethrough at least two radial spaced holes normal to said bracket and located proximate to the parts of said brackets disposed between said first pair of adjacent coils, said parts of said bracket having different levels thereof such that the axes of said holes are parallel to the axis of said coil spring dispite the inclination in said first adjacent pair of coils between said radially opposed points which said first bracket is secured to said spring;
- a third part intermediate said parts of said first bracket disposed between said first pair of adjacent coils having a stepped level intermediate the levels of said aforementioned parts of said first bracket,
- first fastening means adapted to fasten said first bracket to said mounting surface of said structure by threadedly engaging said holes of said bracket;
- a second bracket for fastening said coil spring to said mounting surface of said base disposed between a second pair of adjacent coils proximate to the other end of said spring and secured to said spring at radially opposed points thereof by the extension force of said coils, said bracket having formed therethrough at least two radial spaced holes normal to said bracket and located proximate to the parts of said bracket disposed between said second pair of adjacent coils, said parts of said bracket having different levels thereof such that the axes of said holes are parallel to the axis of said coil spring despite the inclination in said second adjacent pair of coils between said radially opposed points at which said second bracket is secured to said spring;
- a third part intermediate said parts of said second bracket disposed between said second pair of adjacent coils having a stepped level intermediate the levels of said aforementioned parts of said second bracket, and
- second fastening means adapted to fasten said second bracket to said mounting surface of said base by threadedly engaging said holes of said bracket.

2. The mounting apparatus of claim 1 wherein said first pair of adjacent coils comprises the second and third coils from said one end of said spring.

3. The mounting apparatus of claim 1 wherein said second pair of adjacent coils comprises the second and third coils from said other end of said spring.

4. The mounting apparatus of claim 1 wherein the intermediate parts of said first and second brackets have formed therein a hole parallel to the axis of said coil spring.

* * * * *

UNITED STATES PATENT AND TRADEMARK OFFICE
CERTIFICATE OF CORRECTION

PATENT NO. : 4,033,536
DATED : July 5, 1977
INVENTOR(S) : David U. Hillstrom

It is certified that error appears in the above–identified patent and that said Letters Patent are hereby corrected as shown below:

Column 1, line 21: "J" should be --"J"--.  Column 2, line 20: "sring" should be --spring--.  Column 2, line 23: "veiw" should be --view--.  Column 3, line 22: "hole" should be --hold--.  Column 3, line 33: after "30" insert --of--.  Column 3, line 35: after "28" insert --and the point of contact with segment 30, the level of segment 30--.  Column 4, line 44: "imtermediate" should be --intermediate--.  Column 5, line 10, Claim 1: "to" should be --of--.  Column 5, line 13, Claim 1: "brackets" should be --bracket--.

Signed and Sealed this

Eighth Day of November 1977

[SEAL]

Attest:

RUTH C. MASON
Attesting Officer

LUTRELLE F. PARKER
Acting Commissioner of Patents and Trademarks